(12) United States Patent
Reitinger

(10) Patent No.: US 9,651,364 B2
(45) Date of Patent: May 16, 2017

(54) METHOD AND DEVICE FOR LASER-OPTICAL DETECTION OF A SURFACE MOVEMENT OF A SAMPLE USING REFERENCE BEAMS RESPECTIVELY SUPERIMPOSED ON MEASUREMENT BEAMS IN PHOTOREFRACTIVE/ELECTRO-OPTICAL ELEMENTS

(71) Applicants: Fill Gesellschaft m.b.H., Gurten (AT); Research Center for Non Destructive Testing GmbH, Linz (AT)

(72) Inventor: Bernhard Josef Reitinger, Alkoven (AT)

(73) Assignees: Fill Gesellschaft m.b.H., Gurten (AT); Research Center for Non Destructive Testing GmbH, Linz (AT)

( * ) Notice: Subject to any disclaimer, the term of this patent is extended or adjusted under 35 U.S.C. 154(b) by 83 days.

(21) Appl. No.: 14/438,713

(22) PCT Filed: Oct. 30, 2013

(86) PCT No.: PCT/AT2013/050207
§ 371 (c)(1),
(2) Date: Apr. 27, 2015

(87) PCT Pub. No.: WO2014/066922
PCT Pub. Date: May 8, 2014

(65) Prior Publication Data
US 2015/0300813 A1     Oct. 22, 2015

(30) Foreign Application Priority Data
Oct. 31, 2012   (AT) .............................. A 1171/2012

(51) Int. Cl.
| | | |
|---|---|---|
| *G01B 9/02* | (2006.01) |
| *G01B 11/14* | (2006.01) |
| *G01H 9/00* | (2006.01) |

(52) U.S. Cl.
CPC .......... *G01B 11/14* (2013.01); *G01B 9/02027* (2013.01); *G01B 9/02041* (2013.01); *G01H 9/00* (2013.01); *G01B 2290/45* (2013.01)

(58) Field of Classification Search
CPC   G01B 11/14; G01B 9/02027; G01B 9/02041; G01B 2290/45; G01H 9/00
See application file for complete search history.

(56) References Cited

U.S. PATENT DOCUMENTS

| | | |
|---|---|---|
| 5,080,491 A | 1/1992 | Monchalin et al. |
| 5,131,748 A | 7/1992 | Monchalin et al. |
| (Continued) | | |

FOREIGN PATENT DOCUMENTS

| | | |
|---|---|---|
| CA | 2 007 190 A1 | 7/1991 |
| CA | 2 042 352 A1 | 11/1992 |
| (Continued) | | |

OTHER PUBLICATIONS

International Search Report of PCT/AT2013/050207, mailed Feb. 28, 2014.
(Continued)

*Primary Examiner* — Hwa Lee
(74) *Attorney, Agent, or Firm* — Collard & Roe, P.C.

(57) ABSTRACT

A method for laser-optical detection of a surface movement of a sample (1) is specified, whereby a first laser reference beam (10) is superimposed with a first laser measurement beam (12) directed onto the sample (1) and reflected by the latter in a first photorefractive/electro-optical element (4). In addition, a second reference beam (11) identical to the first reference beam (10) is superimposed with a second mea-
(Continued)

surement beam (13) identical to the first measurement beam (12) in a second photorefractive/electro-optical element (5). Mutually inverse voltages are applied to the two photorefractive/electro-optical elements (4, 5). The light emerging from the photorefractive/electro-optical elements (4, 5) is converted into electric signals which are subtracted from one another prior to the signal evaluation. Also specified is an arrangement for implementing said method.

9 Claims, 3 Drawing Sheets

(56) References Cited

U.S. PATENT DOCUMENTS

| | | | |
|---|---|---|---|
| 5,680,212 | A | 10/1997 | Blouin et al. |
| 6,844,936 | B2 | 1/2005 | Dalhoff |
| 2005/0237533 | A1 | 10/2005 | Lal et al. |
| 2015/0043004 | A1 | 2/2015 | Tan et al. |

FOREIGN PATENT DOCUMENTS

| | | |
|---|---|---|
| CN | 102853771 A | 1/2013 |
| CN | 103308151 A | 9/2013 |
| EP | 1 262 734 A1 | 12/2002 |
| WO | 97/39305 A1 | 10/1997 |

OTHER PUBLICATIONS

Delaye P. et al., Detection of ultrasonic motion of a scattering surface by photorefractive InP:Fe under an applied dc field, Journal of the Optical Society of America—B, Optical Society of America, Washington, US, vol. 14, No. 7, Jul. 1, 1997 (Jul. 1, 1997), pp. 1723-1734.

Armin Hochreiner et al., Quasi-balanced two-wave mixing interferometer for remote ultrasound detection, Journal of Modern Optics, 60:16, Sep. 20, 2013 (Sep. 20, 2013), pp. 1327-1331.

METHOD AND DEVICE FOR LASER-OPTICAL DETECTION OF A SURFACE MOVEMENT OF A SAMPLE USING REFERENCE BEAMS RESPECTIVELY SUPERIMPOSED ON MEASUREMENT BEAMS IN PHOTOREFRACTIVE/ELECTRO-OPTICAL ELEMENTS

CROSS REFERENCE TO RELATED APPLICATIONS

This application is the National Stage of PCT/AT2013/050207 filed on Oct. 30, 2013, which claims priority under 35 U.S.C. §119 of Austrian Application No. A 1171/2012 filed on Oct. 31, 2012, the disclosure of which is incorporated by reference. The international application under PCT article 21(2) was not published in English.

The invention relates to a method for laser-optical detection of a surface movement of a sample, whereby a first reference beam obtained from a laser beam is superimposed with a first measurement beam obtained from said laser beam which is directed towards the sample and reflected by the latter in a first photorefractive/electro-optical element. The light which emerges from the first photorefractive/electro-optical element is converted into a first electric signal and then evaluated.

The invention further relates to an arrangement for laser-optical detection of a surface movement of a sample, comprising
a laser source which generates a laser beam,
a first photorefractive/electro-optical element,
means for superimposing a first reference beam obtained from a laser beam with a first measurement beam obtained from this laser beam which is directed towards the sample and reflected by the sample in the first photorefractive/electro-optical element and
means for converting the light emerging from the first photorefractive/electro-optical element into a first electric signal.

Such a method and such an arrangement are known per se and are used to test materials, for example. To this end, a sample is excited so that it vibrates, for example by means of an excitation laser which excites the sample in order to induce ultrasonic vibrations. The vibrations occurring at the surface are measured by laser interferometry and provide a basis for information about cavities in the interior of the sample as well as other inhomogeneities.

Other aspects of this prior art are known from U.S. Pat. No. 5,080,491 A, U.S. Pat. No. 5,131,748 A, CA 2,042,352 A1 and WO 97/39305 A1, for example.

The disadvantage of the known method outlined above is that the signal obtained is buried in noise to a relatively high degree. Although U.S. Pat. No. 5,080,491 A attempts to obtain a better signal quality, the equipment is technically complex and expensive. Other disadvantages are the need for mechanically moved mirrors as well as a working point that is difficult to set.

Accordingly, it is an objective of the invention to propose an improved method and an improved arrangement for laser-optical detection of a surface movement of a sample. In particular, the intention is to improve the signal quality without making the arrangement needed to take the measurement excessively complicated. Specifically, mechanically moved parts should be avoided as far as possible.

The objective of the invention is achieved by means of a method of the type outlined above, whereby a second reference beam substantially identical to the first reference beam is superimposed with a second measurement beam substantially identical to the first measurement beam in a second photorefractive/electro-optical element and the light emerging from the second photorefractive/electro-optical element is converted into a second electric signal which is subtracted from the first electric signal prior to evaluation, and mutually inverse voltages are applied to the two photorefractive/electro-optical elements.

The objective is also achieved by means of an arrangement of the type outlined above, additionally comprising:
a second photorefractive/electro-optical element,
means for applying mutually inverse voltages to the first and second photorefractive/electro-optical element,
means for generating a second reference beam substantially identical to the first reference beam,
means for generating a second measurement beam substantially identical to the first measurement beam,
means for superimposing the second reference beam with the second measurement beam in the second photorefractive/electro-optical element,
means for converting light emerging from the second photorefractive/electro-optical element into a second electric signal and
means for evaluating the differential signal between the first electric signal and the second electric signal.

The fact that mutually inverse voltages are applied to the photorefractive/electro-optical elements means that the optical signals emerging from the photorefractive/electro-optical elements and hence the electric signals derived from them are also mutually inverse. During the evaluation, a difference is then formed between the first and second electric signal. As a result, the signal intensity of the measurement signal is doubled on the one hand and interference, which occurs for example when the ultrasonic wave is generated, is eliminated on the other hand. In this manner, the signal to noise ratio and hence the laser-optical detection of a surface movement of a sample can be significantly improved. The measuring arrangement advantageously has absolutely no mechanically moved parts.

At this stage, it should be pointed out that the proposed arrangement may also be regarded as a "vibrometer".

Other advantageous embodiments and additional features of the invention are defined in the dependent claims as well as the description given with reference to the appended drawings.

It is of advantage if the laser beam is split into a first and a second reference beam as well as a first measurement beam which can be directed onto a sample and a second measurement beam is branched off from the first measurement beam reflected by the sample. Along the same lines, it is of advantage if the measuring arrangement comprises
means for splitting the laser beam into a first and a second reference beam as well as a first measurement beam which can be directed onto a sample and
means for branching off a second measurement beam from the first measurement beam reflected by the sample.

This offers a relatively simple way of producing two substantially identical reference beams and two substantially identical measurement beams.

In this respect, it is of advantage
if the laser beam is split by means of a first polarizing beam splitter into a first s-polarized reference beam and a first p-polarized measurement beam,
if, by means of a second polarizing beam splitter, the s-polarized part of the first measurement beam reflected by the sample is deflected into the branch leading to the photorefractive/electro-optical elements, if, by means of a third beam splitter, a second s-polarized measurement beam is branched off from the first s-polarized measurement beam and if, by means of a fourth beam splitter, a second s-polarized reference beam is branched off from the first s-polarized reference beam.

Along similar lines, it is of advantage if the measuring arrangement comprises a first polarizing beam splitter for splitting the laser beam into a first s-polarized reference beam and a first p-polarized measurement beam, a second polarizing beam splitter for deflecting the s-polarized part of the first measurement beam reflected by the sample into the branch leading to the photorefractive/electro-optical elements, a third beam splitter for branching off a second s-polarized measurement beam from the first s-polarized measurement beam and a fourth beam splitter for branching off a second s-polarized reference beam from the first s-polarized reference beam.

Based on this variant, therefore, a laser beam is firstly split into a first reference beam and a first measurement beam. A second reference beam is then branched off from the first reference beam and a second measurement beam is branched off from the reflected first measurement beam.

It is also of advantage if, before reaching the first polarizing beam splitter, the laser beam passes through a first $\lambda/2$ plate, and if the first measurement beam directed onto the sample respectively the first measurement beam reflected by the sample passes through a $\lambda/4$ plate and is thus rotated from the p-polarization into an s-polarization.

Along similar lines, it is of advantage if the measuring arrangement comprises a first $\lambda/2$ plate disposed upstream of the first polarizing beam splitter in the beam direction of the laser beam and a $\lambda/4$ plate disposed adjacent to the second polarizing beam splitter in the direction of the sample.

In particular, this means that the first and second beam splitter can be based on an identical design because the measurement beam reflected by the sample is rotated accordingly by the $\lambda/4$ plate.

It is also of advantage if the laser beam is split by means of a first polarizing beam splitter into a first s-polarized reference beam and a first p-polarized measurement beam, if the first p-polarized measurement beam is directed onto the sample through an aperture in a mirror or through a prism integrated in a glass plate or disposed on it, if the first measurement beam reflected by the sample is deflected by the mirror or, having passed through the glass plate, by a mirror into the branch leading to the photorefractive/electro-optical elements, if the reflected p-polarized measurement beam is rotated by means of a second $\lambda/2$ plate into an s-polarization, if, by means of a third beam splitter, a second s-polarized measurement beam is branched off from the first s-polarized measurement beam and if, by means of a fourth beam splitter, a second s-polarized reference beam is branched off from the first s-polarized reference beam.

Along similar lines, it is of advantage if the measuring arrangement comprises a first polarizing beam splitter for splitting the laser beam into a first s-polarized reference beam and a first p-polarized measurement beam, a) a mirror with an aperture, which is set up so as to direct the first p-polarized measurement beam to the sample through the aperture in the mirror and to deflect the first measurement beam reflected by the sample into the branch leading to the photorefractive/electro-optical elements or b) a glass plate with an integrated or mounted prism as well as a mirror, and the glass plate is set up so as to direct the first p-polarized measurement beam to the sample with the aid of the prism and allow the first measurement beam reflected by the sample to pass through the mirror which is set up so as to deflect the measurement beam into the branch leading to the photorefractive/electro-optical elements, a second $\lambda/2$ plate for rotating the polarization of the reflected p-polarized measurement beam into an s-polarization, a third beam splitter for branching off a second s-polarized measurement beam from the first s-polarized measurement beam and a fourth beam splitter for branching off a second s-polarized reference beam from the first s-polarized reference beam.

In this variant, therefore, instead of the second polarizing beam splitter, a) a mirror with a (central) aperture or b) a glass plate with an integrated or mounted prism is provided. In case a), the measurement beam coming from the laser source passes through the aperture in the mirror and then hits the sample. The measurement beam reflected by the sample is then deflected for the most part (i.e. except for the part lost due to the aperture) through the mirror to the photorefractive/electro-optical elements. In case b), the measurement beam coming from the laser source is deflected through the prism onto the sample. The measurement beam reflected by the sample then passes for the most part (i.e. except for the part lost due to the aperture) through the glass plate and is deflected with the aid of a mirror to the photorefractive/electro-optical elements.

It is also of advantage if the photorefractive/electro-optical elements are provided in the form of photorefractive/electro-optical crystals of bismuth-silicon-oxide (BSO) in particular or in the form of photorefractive/electro-optical polymers. Crystals of bismuth-silicon-oxide are extremely well suited to a detection laser wavelength of 532 nm and are readily available, relatively speaking, thereby making the proposed arrangement very practical.

Finally, it is also of advantage if the arrangement comprises an excitation laser which can be directed onto the sample in order to generate an ultrasonic wave. This enables the sample to be vibrated without the need for contact.

At this stage, it should be pointed out that the different variants of the method and the resultant advantages can literally be applied to the proposed measuring arrangement and vice versa.

To provide a clearer understanding, the invention will be explained in more detail with reference to the appended drawings. Of these:

Figure 1:
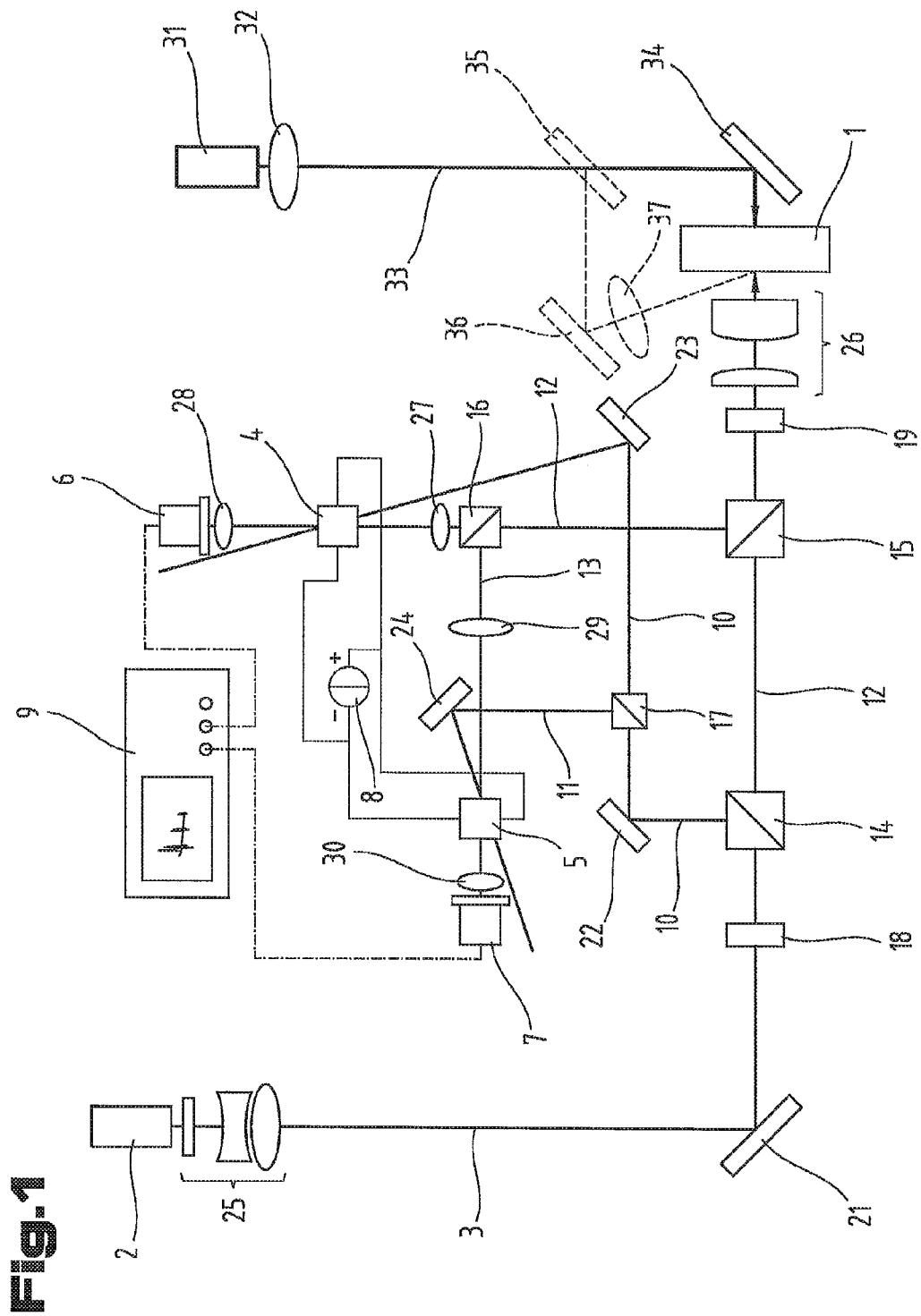
FIG. 1 is a schematically illustrated arrangement for laser-optical detection of a surface movement of a sample.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates an arrangement for laser-optical detection of a surface movement of a sample 1, comprising
- a laser source 2 which generates a laser beam 3,
- a first photorefractive/electro-optical element 4,
- a second photorefractive/electro-optical element 5,
- means 6 for converting the light emerging from the first photorefractive/electro-optical element 4 into a first electric signal,
- means 7 for converting the light emerging from the second photorefractive/electro-optical element 5 into a second electric signal,
- means 8 for applying mutually inverse voltages to the first and second photorefractive/electro-optical element 4, 5 and
- means 9 for evaluating the differential signal between the first electric signal and the second electric signal.

The two photorefractive/electro-optical elements 4 and 5 are preferably provided in the form of photorefractive/electro-optical crystals, in particular comprising bismuth-silicon-oxide (for a detection laser wavelength of 532 nm). However, the two photorefractive/electro-optical elements 4 and 5 may also be made from a photorefractive polymer.

The arrangement also comprises
- means for superimposing a first reference beam 10 obtained from the laser beam 3 with a first measurement beam 12 obtained from this laser beam 3 directed onto the sample 1 and reflected by the latter in the first photorefractive/electro-optical element 4,
- means for generating a second reference beam 11 substantially identical to the first reference beam 10,
- means for generating a second measurement beam 13 substantially identical to the first measurement beam 12 and
- means for superimposing the second reference beam 11 with the second measurement beam 13 in a second photorefractive/electro-optical element 5.

To this end, the laser beam 3 coming from the laser 2 is split into a first and a second reference beam 10, 11 as well as a first measurement beam 12 which can be directed onto a sample 1 and a second measurement beam 13 reflected by the sample 1 branched off from the first measurement beam 12.

For this purpose, the arrangement specifically comprises
- a first polarizing beam splitter 14 for splitting the laser beam 3 into a first s-polarized reference beam 10 and a first p-polarized measurement beam 13,
- a second polarizing beam splitter 15 for deflecting the s-polarized part of the first measurement beam 12 reflected by the sample 1 into the branch leading to the photorefractive/electro-optical elements 4, 5,
- a third beam splitter 16 for branching the second s-polarized measurement beam 13 off from the first s-polarized measurement beam 12 and
- a fourth beam splitter 17 for branching the second s-polarized reference beam 11 off from the first s-polarized reference beam 10.

The splitting ratio of the beam splitters 16, 17 is preferably 50:50.

Figure 2:
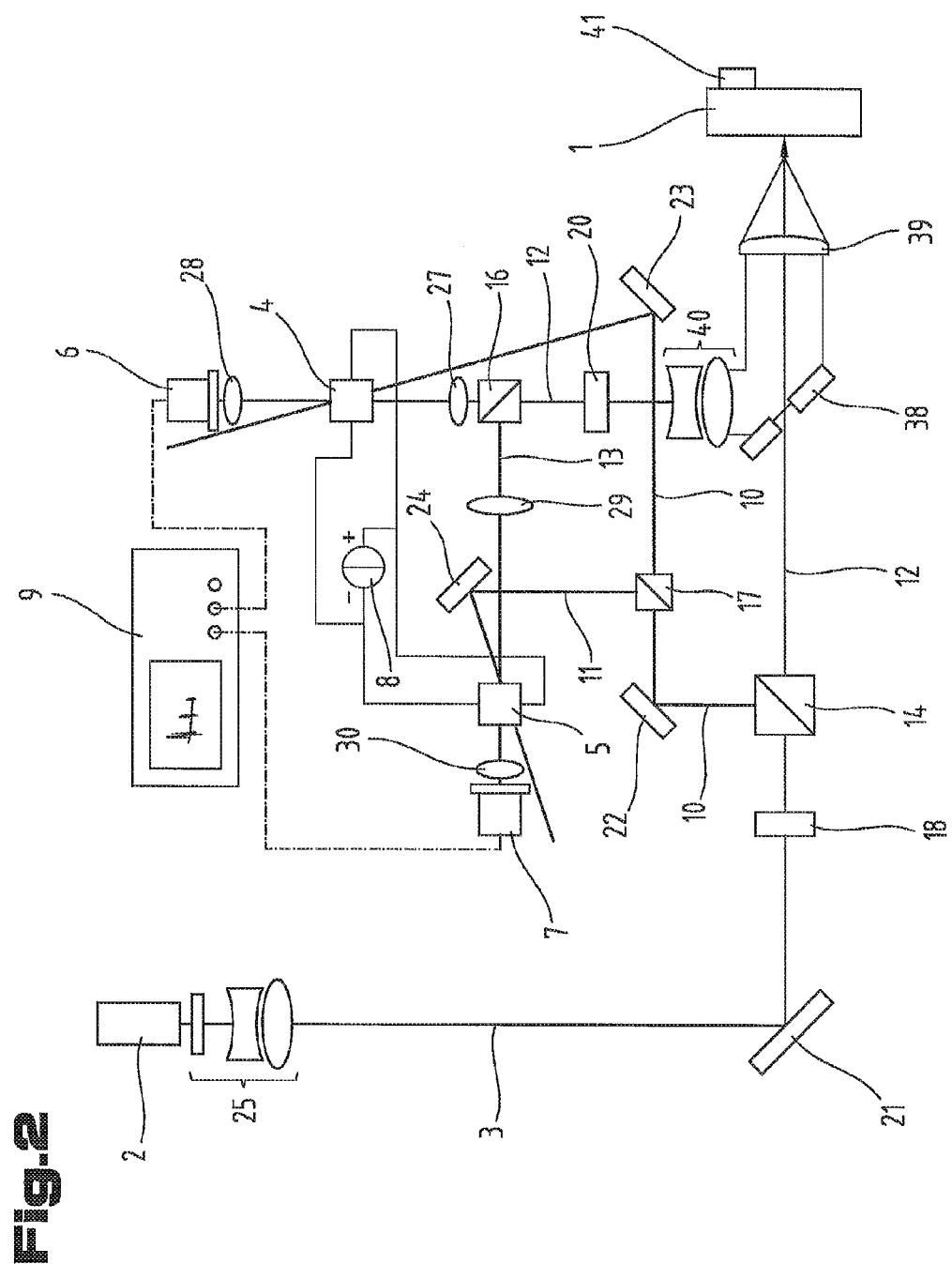
FIG. 2 shows a variant of the arrangement illustrated in FIG. 1 with a mirror having an aperture and FIG. 3 shows a variant of the arrangement illustrated in FIG. 1 with a glass plate having a mounted/integrated prism.
Figure 3:
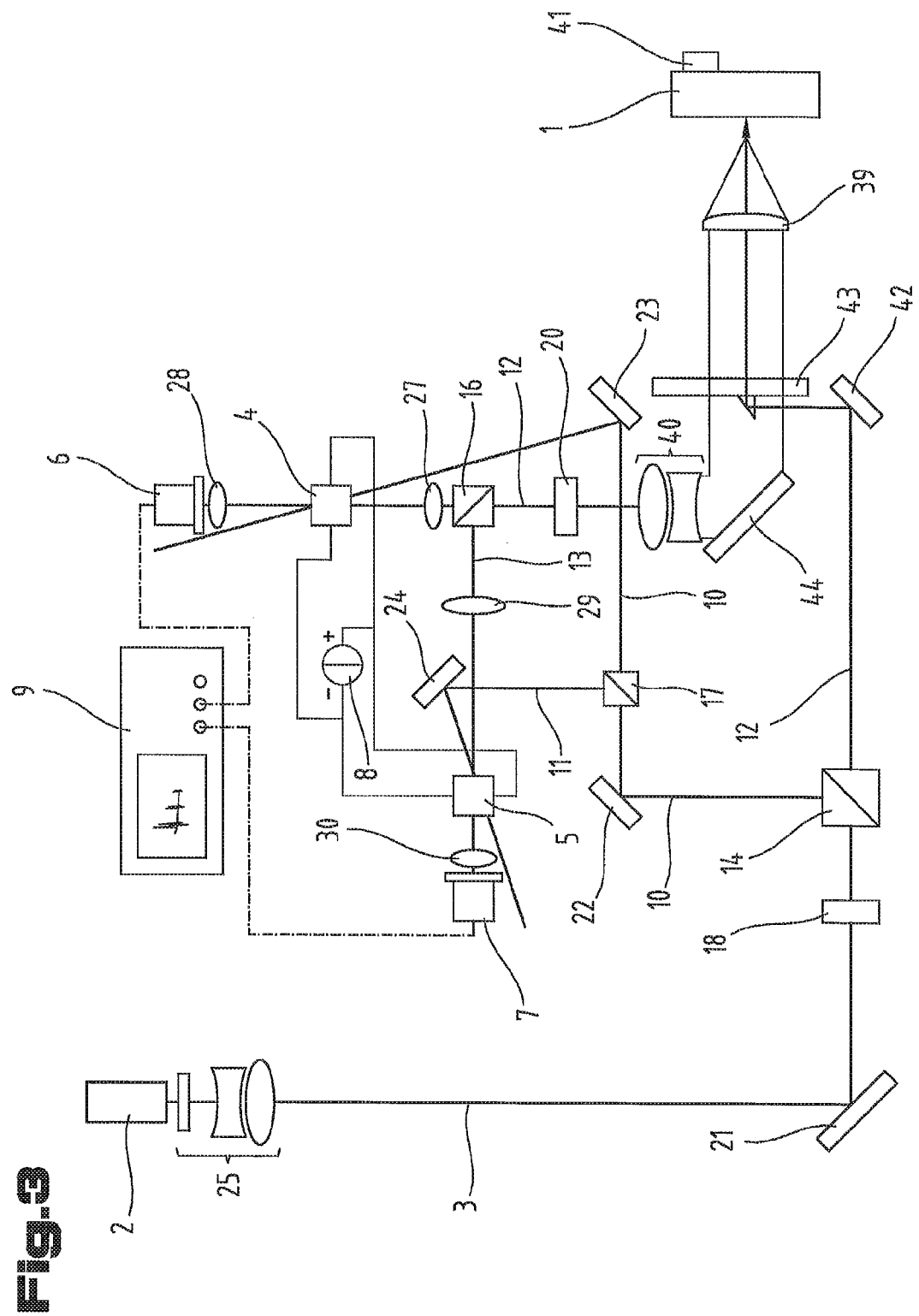

The arrangement further comprises
- a first λ/2 plate 18 disposed upstream of the first polarizing beam splitter 14 in the beam direction of the laser beam 3,
- a λ/4 plate 19 disposed adjacent to the second polarizing beam splitter 15 in the direction of the sample 1 and
- a second λ/2 plate 20 disposed adjacent to the second polarizing beam splitter 15 in the direction of the photorefractive/electro-optical elements 4, 5 illustrated in FIGS. 2 and 3, in order to rotate the polarization of the measurement beam 12.

Also incorporated in the arrangement are various deflector mirrors 21 ... 24, as well as various optical lenses 25 ... 30.

Finally, FIG. 1 illustrates an optional excitation laser 31, the laser beam 33 of which passes through lens 32 and is directed with the aid of a mirror 34 onto the sample 1 in order to generate an ultrasonic wave in the latter.

The arrangement operates in the following manner.

Starting from the laser source 2, the laser beam 3 passes through a lens system 25 and is then deflected with the aid of mirror 21 onto the first λ/2 plate 18. It rotates the polarization direction of the laser beam 2, which hits the first polarizing beam splitter 14 as a result. There, the laser beam 2 is split into a first s-polarized reference beam 10 and a first p-polarized measurement beam 12.

The p-polarized measurement beam 12 then passes through the second polarizing beam splitter 15, the second λ/4 plate 19 and a lens system 26 and then hits the sample 1. As illustrated, the sample 1 can be induced into a vibrating state in a known manner by the excitation laser 31 directed onto it. It would naturally also be conceivable for the sample 1 to be induced into a vibrating state in any other manner.

Due to the Doppler effect, the frequency of the first measurement beam 12 scattered back is then shifted by the speed of the surface movement of the sample 1. In addition, the surface movement causes a phase shift in the first measurement beam 12 scattered back.

It then passes through the lens system 26, the second λ/4 plate 19 and finally hits the second polarizing beam splitter 15, where the s-polarized part of the first measurement beam 12 is deflected by 90°. Having passed through the λ/4 plate 19 twice, the scattered measurement beam 12 is rotated from the p-polarization into an s-polarization. The measurement beam 12 then hits a third beam splitter 16, where the second measurement beam 13 is branched off.

The first reference beam 10 is deflected onto the fourth beam splitter 17 with the aid of mirror 22. There, the second s-polarized reference beam 11 is branched off from the first s-polarized reference beam 10.

The first measurement beam 12 then passes through lens 27 into the first photorefractive/electro-optical element 4. The first reference beam 10 is likewise directed via mirror 23 into the photorefractive/electro-optical element 4 where it is superimposed with the measurement beam 12 or where it interferes with it. Due to the Pockels electro-optic effect and due to the Kerr effect, birefringence can be created in the photorefractive/electro-optical element 4 by means of an electric field. This electric field is generated by means of the voltage source 8.

The resultant measurement beam 12 then passes through lens 28 and in the first photocell 6 is converted into a first electric signal which can be rendered visible in the oscilloscope 9.

The second measurement beam 13 passes through lens 29 and hits the second photorefractive/electro-optical element 5. The second reference beam 11 is likewise deflected via mirror 24 into the second photorefractive/electro-optical element 25 where it is superimposed with the second measurement beam 13 or where it interferes with the latter. The resultant measurement beam 13 passes through lens 30 and is then converted into a second electric signal in the second photocell 7 and can be rendered visible in the oscilloscope 9.

The second measurement beam 13 and the second reference beam 11 are processed in totally the same way as the first measurement beam 12 and first reference beam 10 but with the difference that a voltage applied to the second photorefractive/electro-optical element 5 is the inverse of the voltage applied to the first photorefractive/electro-optical element 4.

Due to the mutually inverse voltages at the photorefractive/electro-optical elements 4, 5, the optical signals obtained from the photorefractive/electro-optical elements 4, 5 and hence also the signals generated by the photocells 6 and 7 are mutually inverse. In the oscilloscope 9, a difference is created between the first and the second electric signal. On the one hand, this doubles the signal intensity of the measurement signal and on the other hand, interference occurring when the optical signal is converted into an electric signal is eliminated. In this manner, the laser-optical detection of a surface movement of a sample can be significantly improved.

At this stage, it should be pointed out that in order to obtain a laser-optical detection of the surface movement of the sample 1, it is not absolutely necessary to evaluate the holograms occurring in the two photorefractive/electro-optical elements 4, 5. Since a phase shift between a reference beam 10, 11 and a measurement beam 12, 13 causes an amplitude modulation of the measurement beam 12, 13 leaving the relevant photorefractive/electro-optical element 4 and to a shift in intensity between the measurement beam 12, 13 leaving the photorefractive/electro-optical element 4, 5 and one reference beam 10, 11, it is sufficient to measure the intensity of the emerging measurement beam 12, 13. The photo-elements 5, 6 may therefore be provided in the form of photoelectric diodes by means of which a change in the intensity of the detected measurement beam 12, 13 can be detected.

FIG. 1 illustrates an optional excitation laser 31, the laser beam 32 of which passes through lens 33 and is directed with the aid of a mirror 34 onto the sample 1 in order to generate an ultrasonic wave in the latter.

In a variant of the arrangement illustrated in FIG. 1, the sample 1 is excited not at its rear face but on its side facing the measurement beam 12. To this end, the laser beam 33 of the excitation laser 31 is directed from a mirror 35 to a mirror 36. From there, the laser beam 33 passes through a lens 37 and then hits the sample 1 where it generates an ultrasonic wave in the manner described above. In this instance, lens 32 can be replaced by lens 37 (see optical path indicted by broken lines).

Generally speaking, it is not necessary for the sample 1 to be excited by means of the excitation laser 31. Instead of the excitation laser 31, it would also be possible to provide a different type of vibrator, for example a piezo-vibrator (see also FIG. 2). If the sample 1 vibrates of its own accord, separate means for inducing vibrations can be dispensed with altogether.

In another variant, it would also be possible for the arrangement to be provided with only the left-hand lens of the lens group 26. Another option, instead of the second 212 plate, is more generally to provide a polarization controller 20 by means of which the polarization direction of the measurement beam 12 can be rotated as required.

With regard to polarization directions, it should generally be noted that the orientation of the polarization of the reference beams 10, 11 and measurement beams 12, 13 specifically illustrated in FIG. 1 is not absolutely necessary for the function of the arrangement. The reference beams 10, 11 and measurement beams 12, 13 crossed in the photorefractive/electro-optical elements 4, 5 may also have any other polarizations. This being the case, other elements may also be provided as a means of influencing the polarization.

FIG. 2 illustrates a slightly modified variant of the arrangement illustrated in FIG. 1. Instead of the second polarizing beam splitter 15, a mirror 38 with a (central) aperture is provided in this example. The measurement beam 12 coming from the first polarizing beam splitter 14 passes through the aperture in the mirror 38, through lens 39 and then hits the sample 1. The reflected (and scattered) measurement beam 1 is collimated with the aid of lens 39 and (for the most part) is directed by mirror 38 onto the lens system 40, where it is bundled again and directed onwards to the photorefractive/electro-optical elements 4, 5.

FIG. 3 illustrates another variant of an arrangement for laser-optical detection of a surface movement of a sample 1, which is very similar to the arrangement illustrated in FIG. 2. Where this variant differs from that of FIG. 2 is that a (full) mirror 42 is provided, which directs the measurement beam 12 coming from the first polarizing beam splitter 14 onto a glass plate 43 with a prism integrated in it or mounted on it. The measurement beam 12 is directed onto the sample 1 by the prism via lens 39. The reflected (and scattered) measurement beam 1 is collimated by lens 39 and passes (for the most part) through the glass plate 43. From there, it is passed on to a deflector mirror 44, which directs the measurement beam 12 onto the lens system 40, where it is bundled again and directed onwards to the photorefractive/electro-optical elements 4, 5.

The examples of embodiments illustrate possible variants of an arrangement for laser-optical detection of a surface movement of a sample 1 as proposed by the invention, and it should be pointed out at this stage that the invention is not restricted to the variants of it specifically described here.

In particular, it should be noted that the illustrated arrangements may in reality comprise more or fewer components than those illustrated.

The objective underlying the independent solutions proposed by the invention may be found in the description.

| List of reference numbers | |
|---|---|
| 1 | Sample |
| 2 | Laser source |
| 3 | Laser beam |
| 4 | First photorefractive/electro-optical element |
| 5 | Second photorefractive/electro-optical element |
| 6 | First photo-element |

-continued

List of reference numbers

| | |
|---|---|
| 7 | Second photo-element |
| 8 | Voltage source |
| 9 | Oscilloscope |
| 10 | First reference beam |
| 11 | Second reference beam |
| 12 | First measurement beam |
| 13 | Second measurement beam |
| 14 | First polarizing beam splitter |
| 15 | Second polarizing beam splitter |
| 16 | Third beam splitter |
| 17 | Fourth beam splitter |
| 18 | First λ/2 plate |
| 19 | λ/4 plate |
| 20 | Second λ/2 plate/polarization controller |
| 21 | Deflector mirror |
| 22 | Deflector mirror |
| 23 | Deflector mirror |
| 24 | Deflector mirror |
| 25 | Optical lens |
| 26 | Optical lens |
| 27 | Optical lens |
| 28 | Optical lens |
| 29 | Optical lens |
| 30 | Optical lens |
| 31 | Excitation laser |
| 32 | Optical lens |
| 33 | Laser beam of the excitation laser |
| 34 | Deflector mirror |
| 35 | Deflector mirror |
| 36 | Deflector mirror |
| 37 | Optical lens |
| 38 | Mirror with aperture/aperture |
| 39 | Optical lens |
| 40 | Optical lens |
| 41 | Piezo vibrator |
| 42 | Deflector mirror |
| 43 | Glass plate with integrated/mounted prism |
| 44 | Deflector mirror |

The invention claimed is:

1. A method for laser-optical detection of a surface movement of a sample, the method comprising:
    obtaining a first reference beam and a first measurement beam from a laser beam,
    directing the first measurement beam onto the sample to reflect the first measurement beam,
    superimposing the first reference beam with the first measurement beam reflected by the sample in a first photorefractive/electro-optical element,
    converting the light emerging from the first photorefractive/electro-optical element into a first electric signal and then evaluating the first electric signal,
    superimposing a second reference beam obtained from the first reference beam with a second measurement beam obtained from the reflected first measurement beam in a second photorefractive/electro-optical element,
    converting the light emerging from the second photorefractive/electro-optical element into a second electric signal,
    subtracting the second electric signal from the first electric signal prior to evaluating the first electric signal, and
    applying mutually inverse voltages to the first and second photorefractive/electro-optical elements.

2. The method according to claim 1, wherein the obtaining of the first reference beam and the first measurement beam occurs by splitting the laser beam,
    wherein the second reference beam is obtained from into a the first reference beam by splitting the first reference beam, and
    wherein the second measurement beam is obtained from the first measurement beam by being branched off from the first measurement beam after the first measurement beam is reflected by the sample.

3. The method according to claim 2, wherein
    the splitting of the laser beam into the first reference beam and the first measurement beam occurs via a first polarizing beam splitter, the first reference beam is a first s-polarized reference beam, and the first measurement beam is a first p-polarized measurement beam,
    the s-polarized part of the first measurement beam reflected by the sample is deflected by a second polarizing beam splitter into the branch leading to the photorefractive/electro-optical elements,
    the branching off of the second measurement beam from the first measurement beam occurs via a third beam splitter, and the second measurement beam is a second s-polarized measurement beam, and
    the splitting of the second reference beam from the first reference beam occurs via a fourth beam splitter, and the second reference beam is a second s-polarized reference beam.

4. The method according to claim 3, wherein the laser beam passes through a first λ/2 plate upstream of the first polarizing beam splitter and the first measurement beam directed onto the sample and the first measurement beam reflected by the sample passes through a λ/4 plate.

5. The method according to claim 2, wherein
    the splitting of the laser beam into the first reference beam and the first measurement beam occurs via a first polarizing beam splitter, the first reference beam is a first s-polarized reference beam, and the first measurement beam is a first p-polarized measurement beam,
    the first p-polarized measurement beam is directed onto the sample through an aperture in a mirror or via a prism integrated in or mounted on a glass plate,
    the first measurement beam reflected by the sample is deflected by the mirror or, having passed through the glass plate, by a mirror into the branch leading to the photorefractive/electro-optical elements,
    the first measurement beam passes through a second λ/2 plate,
    the branching off of the second measurement beam from the first measurement beam occurs via a third beam splitter, and the second measurement beam is a second s-polarized measurement beam, and
    the splitting of the second reference beam from the first reference beam occurs via a fourth beam splitter, and the second reference beam is a second s-polarized reference beam.

6. An arrangement for laser-optical detection of a surface movement of a sample, the arrangement comprising
    a laser source which generates a laser beam,
    a first photorefractive/electro-optical element,
    a first beam splitter configured to split the laser beam into a first reference beam and a first measurement beam and to direct the first measurement beam onto the sample so that the first measurement beam is reflected by the sample,
    a first superimposing device selected from the group consisting of a second beam splitter and a first mirror, the first superimposing device being configured to superimpose in the first photorefractive/electro-optical element the first reference beam with the reflected first measurement beam, a first photocell configured to convert the light emerging from the first photorefractive/electro-optical element into a first electric signal, a second photorefractive/electro-optical element, a voltage source configured to apply mutually inverse voltages to the first and the second photorefractive/electro-optical element, a third beam splitter configured to branch off a second measurement beam from the reflected first measurement beam and to transmit the second measurement beam to the second photorefractive/electro-optical element, a fourth beam splitter configured to branch off a second reference beam from the first reference beam, a second superimposing device comprising a second mirror configured to transmit the second reference beam to the second photorefractive/electro-optical element so that the second reference beam is superimposed with the second measurement beam in the second photorefractive/electro-optical element, a second photocell configured to convert the light emerging from the second photorefractive/electro-optical element into a second electric signal, and an oscilloscope configured to evaluate the differential signal between the first electric signal and the second electric signal.

7. The arrangement according to claim 6, wherein the first beam splitter is a first polarizing beam splitter so that the first reference beam is a first s-polarized reference beam and the first measurement beam is a first p-polarized measurement beam, wherein the second beam splitter is a second polarizing beam splitter for deflecting the s-polarized part of the first measurement beam reflected by the sample into the branch leading to the photorefractive/electro-optical elements, wherein the third beam splitter is configured so that the second measurement beam is a second s-polarized measurement beam, and wherein the fourth beam splitter is configured so that the second reference beam is a second s-polarized reference beam.

8. The arrangement according to claim 6, wherein the first and second photorefractive/electro-optical elements are provided in the form of photorefractive/electro-optical crystals or photorefractive/electro-optical polymers.

9. The arrangement according to claim 6, further comprising an excitation laser configured to be directed onto the sample in order to generate an ultrasonic wave.

* * * * *